United States Patent
Sato

(10) Patent No.: US 8,320,458 B2
(45) Date of Patent: Nov. 27, 2012

(54) FRAME INTERPOLATION DEVICE AND METHOD, AND STORAGE MEDIUM

(75) Inventor: Teruyuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 12/619,319

(22) Filed: Nov. 16, 2009

(65) Prior Publication Data

US 2010/0066914 A1    Mar. 18, 2010

(30) Foreign Application Priority Data

Sep. 12, 2008  (JP) .................. 2008-313610

(51) Int. Cl.
   *H04N 7/28* (2006.01)
(52) U.S. Cl. .............. 375/240.16; 375/240.12
(58) Field of Classification Search .............. 375/240.16
   See application file for complete search history.

(56) References Cited

U.S. PATENT DOCUMENTS

| | | | | |
|---|---|---|---|---|
| 6,452,971 B1 * | 9/2002 | Iwasaki et al. | ........... | 375/240.12 |
| 7,139,019 B2 | 11/2006 | Kondo et al. | | |
| 2004/0021775 A1 | 2/2004 | Kondo et al. | | |
| 2006/0285596 A1 * | 12/2006 | Kondo et al. | ........... | 375/240.16 |

FOREIGN PATENT DOCUMENTS

| | | |
|---|---|---|
| JP | 8-32043 | 3/1996 |
| JP | 8-223540 | 8/1996 |
| JP | 11-112940 | 4/1999 |
| JP | 2000-134585 | 5/2000 |
| JP | 2003-6651 | 1/2003 |

* cited by examiner

*Primary Examiner* — Christopher S Kelley
*Assistant Examiner* — Maria Vazquez Colon
(74) *Attorney, Agent, or Firm* — Staas & Halsey LLP

(57) ABSTRACT

A frame interpolation device and method are provided. The device includes an in-screen average motion vector calculation section, a scene detection control section, a correlation calculation section, a no-motion determination section, a search center weight assigning section, a vector center weight assigning section and a weight assigning selection processing section. The in-screen average motion vector calculation section calculates an in-screen average motion vector in a screen for each the video frame. The scene detection control section detects any scene showing a uniform motion in each video frame. The correlation calculation section calculates, for each motion vector candidates for each block in target video frame, a correlation value between the target video frame and other previous video frames. The weight assigning selection processing section selects the search center weight assigning section or the vector center weight assigning section, and provides thereto the correlation value. An output from selected section is output.

6 Claims, 19 Drawing Sheets

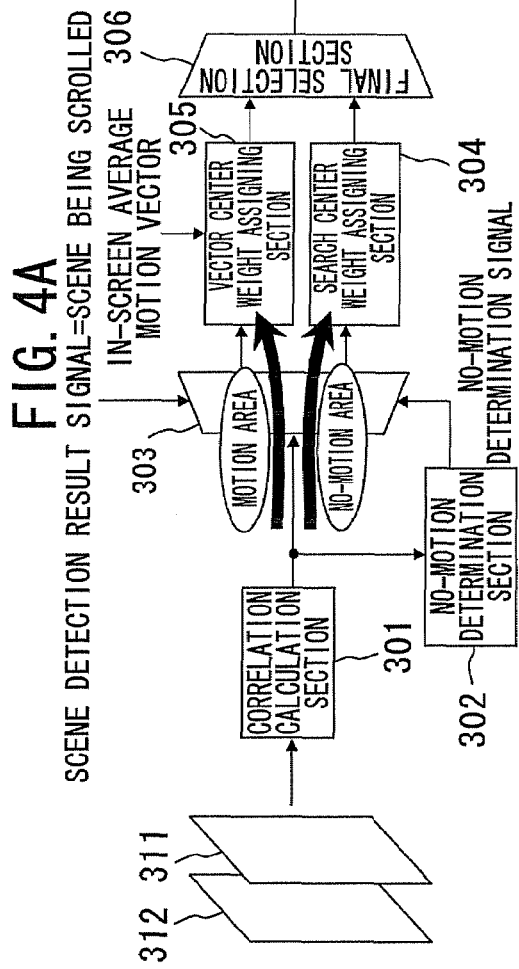
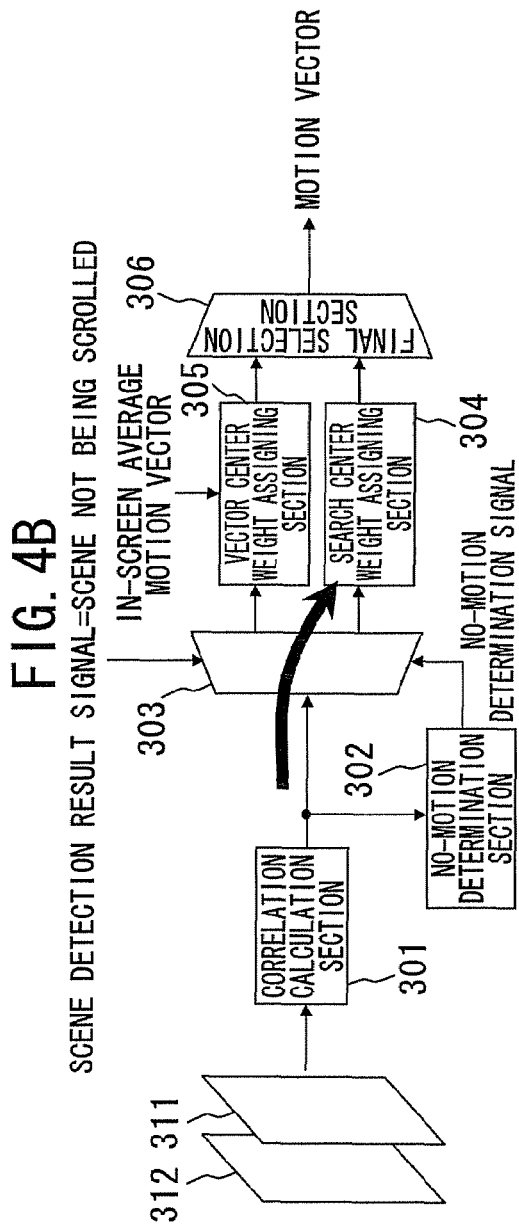

SELECTION OF (−1, 0)

SELECTION OF (+1, 0)

FIG. 9

|     | -2  | -1  | 0   | +1  | +2  |
|-----|-----|-----|-----|-----|-----|
| -2  | 984 | 889 | 731 | 611 | 714 |
| -1  | 746 | 398 | 405 | 321 | 398 |
| 0   | 811 | 176 | 61  | 210 | 564 |
| +1  | 931 | 476 | 223 | 266 | 411 |
| +2  | 768 | 667 | 312 | 569 | 377 |

FRAME INTERPOLATION DEVICE AND METHOD, AND STORAGE MEDIUM

CROSS-REFERENCE TO RELATED APPLICATION(S)

This application is related to and claims priority to Japanese Patent Application No. 2008-313610 filed on Dec. 9, 2008, and incorporated herein by reference.

BACKGROUND

1. Field

The embodiments discussed herein are directed to a frame interpolation technology for newly generating a nonexistent video frame by interpolation based on any two existing video frames, and a technology using such a frame interpolation technology.

2. Description of the Related Art

A liquid crystal display (LCD) used for a thin-screen television is a hold type display which continues to perform rendering until a next video frame comes. This is different from a CRT (Cathode Ray Tube) and a plasma display that are each of impulse type display, i.e., perform rendering of a momentary image on a display.

With the hold type display as such, a phenomenon called motion judder occurs to a moving object(s) in a video due to mismatching between motion interpolation and the hold type display. The motion interpolation may be performed by the chase motion of a viewer's eyeballs, and with the hold type display, the position remains the same. Conventionally, digital terrestrial broadcasting for mobiles has a frame rate of about 15 fps. This frame rate is lower than that of the current analog broadcasting, and thus the motion does not often look smooth and natural enough for viewers.

In order to solve such problems, viewers have been provided with a video through with motion interpolation, i.e., an intermediate frame is created between video frames. FIG. 18 illustrates such a motion interpolation process. A motion vector is found in a display screen from a frame 1801 at a time t-1 and a frame 1803 at a time t, and then motion interpolation may be performed with the lapse of time ½ after the time t-1, for example. Such motion interpolation accordingly generates an interpolation frame 1802 at a time t-½ between the times t-1 and t so that the resulting video can be increased in quality.

A problem with this method for finding a motion vector, is an enormous amount of calculation is required. Especially when a target for interpolation is a video with a conspicuously large motion, i.e., a video that will be noticeably affected by frame interpolation, such a search of motion vector will not be completed within any practical time. In consideration thereof, frame interpolation selectively on the basis of scene has been proposed, e.g., examples include JP-A-11-112940 and JP-A-2000-134585. With such frame interpolation selectively on the basis of scene, target frames for interpolation are only those showing certain specific characteristics of motion, thereby implementing frame interpolation.

FIG. 19 illustrates an exemplary configuration of a frame interpolation device of such a scene-basis-selection type. A scene selection section 1901 uses as a basis a motion vector found by a motion vector search section 1902 to determine whether each scene shows certain specific characteristics, and then forwards an interpolation control signal to an interpolation image generation section 1903. This interpolation control signal is turned ON (made effective) when any scene showing certain specific characteristics is detected, and is otherwise turned OFF (made ineffective). Only when the interpolation control signal is being turned ON, the interpolation image generation section 1903 generates an interpolation frame from the motion vector.

The scene showing certain specific characteristics is exemplified by a scene being scrolled at a constant speed. With such a scene being scrolled, the motion vector in the screen is required to be aligned in orientation. However, if the screen includes any portion not moving at all like merged subtitles, the scene is not selected because the motion vector thereof has a 0-component. Also in the screen, any portion showing less activity such as sky and water surface causes a wide range of deviation to the motion vector, and thus the scene will hardly be selected. If such a scene selection is not made correctly, frame interpolation will instead cause the resulting moving images look conspicuously not smooth and natural especially at the time of change of a frame-interpolated scene to/from a not-frame-interpolated scene.

As described above, a problem with such previous frame interpolation selectively on the basis of scene is how to detect any target scenes. A method addressing the problem includes searching a motion vector with a frame image area divided into a non-moving area and a moving area. This method allows detection of a correct motion vector even from a video including any portion with less activity like sky and sea, and even if the video includes any portion not moving at all, prevents the portion from being interpolated with a deviation in the direction of scrolling.

Such previous frame interpolation selectively on the basis of scene as above often does not look effective enough with digital terrestrial broadcasting for mobiles, which is with a low frame rate of about 15 fps and with a screen being small for viewing and listening. That is, because any frame from which no scene is detected is not subjected to frame interpolation, the resulting video will look quite awkward during digital terrestrial broadcasting or others with a low frame rate.

In consideration thereof, when a target for interpolation is a video with a low frame rate, the frame interpolation function may be always activated for the purpose of improving the smoothness of motion while allowing some degree of "irregularities" in the video as a result of erroneous interpolation. A frame interpolation device in which the frame interpolation function is always activated is implemented by the configuration of FIG. 19 without including the scene selection section 1901, for example. With the device configured as such, the motion vector search section 1902 makes a search of a motion vector with a frame image area divided into a non-moving area and a moving area, and then executes a weight assigning process to the moving area in accordance with an in-screen average motion vector, thereby determining the eventual motion vector.

The problem with such always-activated frame interpolation is that, when the moving area is detected in a frame not including any specific scene, various types of movements in the video will be directed in the direction of only one average motion vector. As a result of such an erroneous interpolation process, the resulting reproduced video will not look smooth and natural.

To address the problem described above, with such always-activated flame interpolation, the weight assigning process may not be executed to the moving area in accordance with an in-screen average motion vector. If this is the case, however, when the moving area is detected in a frame including any specific scene such as scene being scrolled, any portion with less activity in the video cannot be appropriately interpolated, thereby causing deterioration of the image quality.

SUMMARY

It is an aspect of the embodiments discussed herein to provide a frame interpolation device and method.

The above aspects can be attained by a system including an in-screen average motion vector calculation section, a scene detection control section, a correlation calculation section, a no-motion determination section, a search center weight assigning section, a vector center weight assigning section, a weight assigning selection processing section and a final selection section. The in-screen average motion vector calculation section calculates an in-screen average motion vector in a screen for each of the video frames, the in-screen average motion vector being averaged the motion vectors in the screen. The scene detection control section detects any scene showing a uniform motion in each of the video frames. The correlation calculation section calculates, for each of a plurality of motion vector candidates for each of the blocks in the video frame currently being a target, a correlation value between the current-target video frame and other previous video frames. The no-motion determination section that determines whether the blocks in the current-target video frame are in a no-motion area. The search center weight assigning section performs weight assigning to the correlation value of each of the plurality of motion vector candidates in each of the blocks to make the motion vector candidate showing less activity from a center of search for block more likely to be selected, and determines a first motion vector candidate among the plurality of motion vector candidates. The vector center weight assigning section performs weight assigning to the correlation value of each of the plurality of motion vector candidates in each of the blocks to make the motion vector candidate in the closer vicinity of the in-screen average motion vector more likely to be selected, and determines a second motion vector candidate among the plurality of motion vector candidates. The weight assigning selection processing section selects the search center weight assigning section or the vector center weight assigning section based on a scene detection result by the scene detection control section and a determination result by the no-motion determination section, for each of the blocks in the current-target video frame, and provides thereto the correlation value output from the correlation calculation section. The final selection section outputs the first motion vector candidate or the second motion vector candidate provided the correlation value from the search center weight assigning section or the vector center weight assigning section selected by weight assigning selection processing section.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 4A and 4B each illustrate t a selection operation of a weight assigning section;

FIG. 9 illustrates a table of similarity;

DETAILED DESCRIPTION OF THE EMBODIMENT(S)

Figure 1:
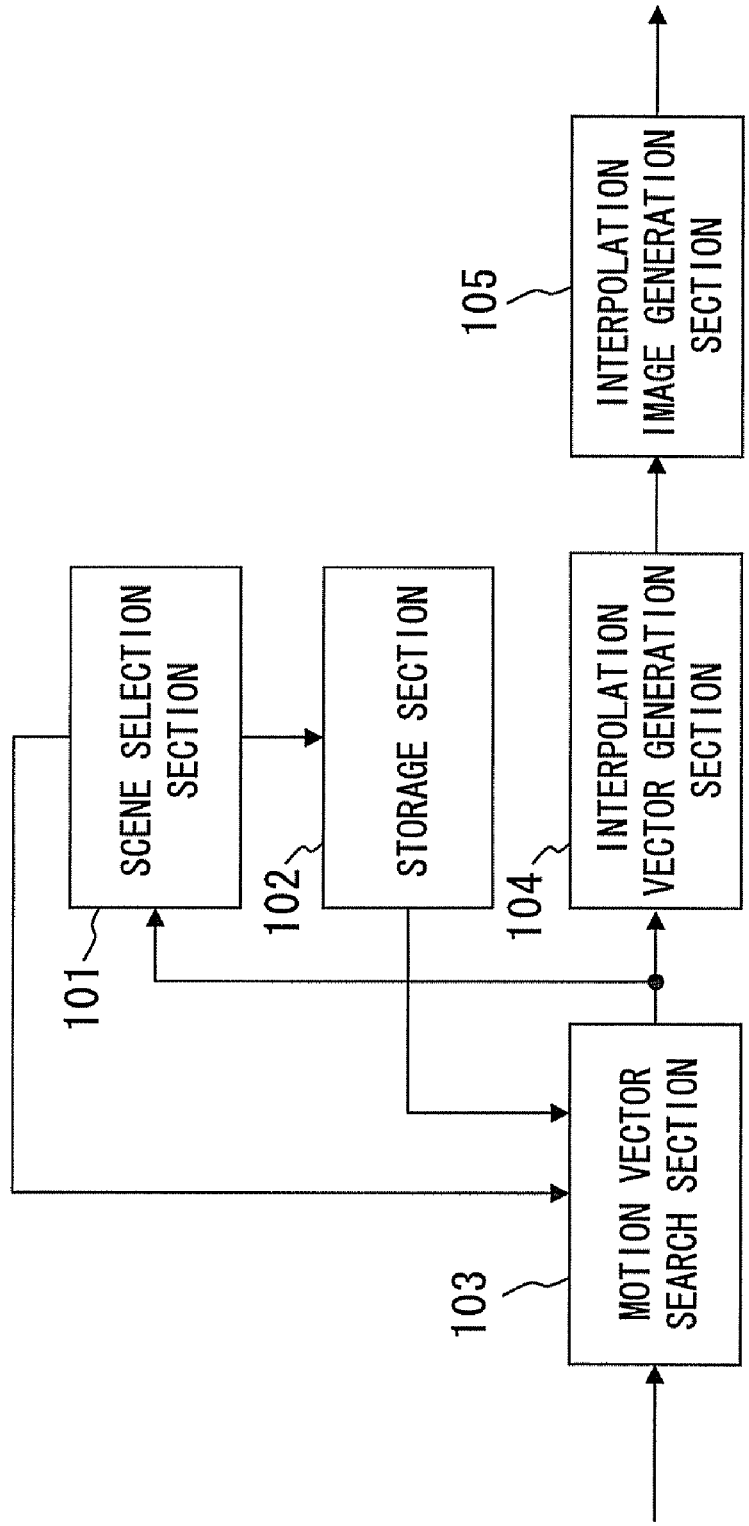
FIG. 1 illustrates a frame interpolation device of an embodiment.

FIG. 1 illustrates an exemplary configuration of a frame interpolation device of this embodiment. This frame interpolation device includes a scene selection section 101, a storage section 102, a motion vector search section 103, an interpolation vector generation section 104, and an interpolation image generation section 105.

The motion vector search section 103 performs block matching between any two input video frames using a block, i.e., rectangular area, of a predetermined size, and from the result of the matching, finds a motion vector of a moving object. The resulting motion vector may be forwarded to both the scene selection section 101 and the interpolation vector generation section 104.

The scene selection section 101 executes a motion vector statistical process in the screen, thereby determining whether each frame includes any scene showing the effects of interpolation. Based on the determination result, the scene selection section 101 forwards a scene detection result signal to the motion vector search section 103. This scene detection result signal is turned ON (made effective) when any scene showing the effects of interpolation is detected, and is otherwise turned OFF (made ineffective). The scene showing the effects of interpolation is exemplified by a scene being scrolled at a constant speed in a fixed direction such as vertical or horizontal direction.

In the process of such a scene selection, the scene selection section 101 calculates an average motion vector in the screen, and stores the resulting average motion vector in the storage section 102. When the screen is being scrolled in its entirety, for example, the in-screen average motion vector corresponds to the speed of scrolling. The motion vector search section 103 extracts the previous in-screen average motion vector stored in the storage section 102 for use it as a reference motion vector, thereby finding a motion vector based on the result of the matching.

Based on the motion vector found by the motion vector search section 103, the interpolation vector generation section 104 generates an interpolation vector for output to the interpolation image generation section 105. The interpolation vector indicates the position to start interpolating pixels, and is used to calculate a reference pixel for deriving the image of an interpolation frame.

For generating an interpolation frame between any two input video frames, for example, the interpolation vector corresponds to a vector with the size of ½ of the motion vector. In this embodiment, when the screen cannot be subjected to a search in its entirety, for an area around the screen, an interpolation vector may be generated using an in-screen average motion vector or using a motion vector in the vicinity thereof, for example.

The interpolation image generation section 105 generates an interpolation frame based on an interpolation vector. The in-screen average motion vector is stored in the storage section 102, and is referred to as an estimation vector when a scene detection result signal is turned ON during a search of motion vector at a next timing. When any scene is being detected, it is highly possible that an optimum motion vector will be found in the vicinity of the estimation vector, and the result of a search at a next timing will be also found in the vicinity of the estimation vector. As a result, for detection of a scene, every motion vector in the screen is aligned with the average motion vector, and the next video frame is subjected to feedback to be under effective control of scene selection.

Figure 2:
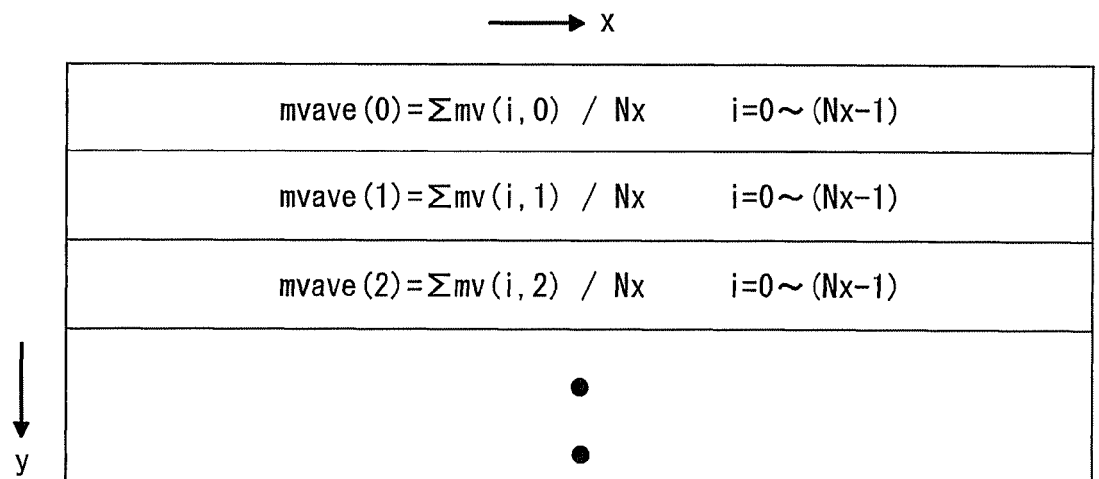
FIG. 2 illustrates calculation of an in-screen average motion vector may be calculated.

FIG. 2 illustrates an exemplary method of finding an in-screen average motion vector. The screen of a video frame is generally divided into a plurality of block areas using a block of a predetermined size, and a motion vector is found for each of the block areas. In this example, the screen is divided into Nx×Ny pieces of block areas with an x axis being along the horizontal direction and a y axis being along the vertical direction. The motion vector at block coordinates (i,j) is denoted as mv(i,j) (where i=0, 1, and others to Nx−1, j=0, 1, and others to Ny−1). Herein, Nx and Ny respectively denote the number of blocks in the horizontal and vertical directions.

The in-screen average motion vector mvaveall may be calculated as in the following equations 1 and 2, i.e., an average value mvave(j) of Nx pieces of mv(i,j) in the horizontal direction may be calculated for every line, and an average value of the resulting Ny pieces of mvave(j) may be calculated.

$$mvave(j) = \frac{\sum_{i=0}^{N_x-1} mv(i, j)}{N_x} \quad (1)$$

$$(j = 0, 1, \ldots, N_y - 1)$$

$$mvaveall = \frac{\sum_{j=0}^{N_y-1} mvave(j)}{N_y} \quad (2)$$

Figure 3:
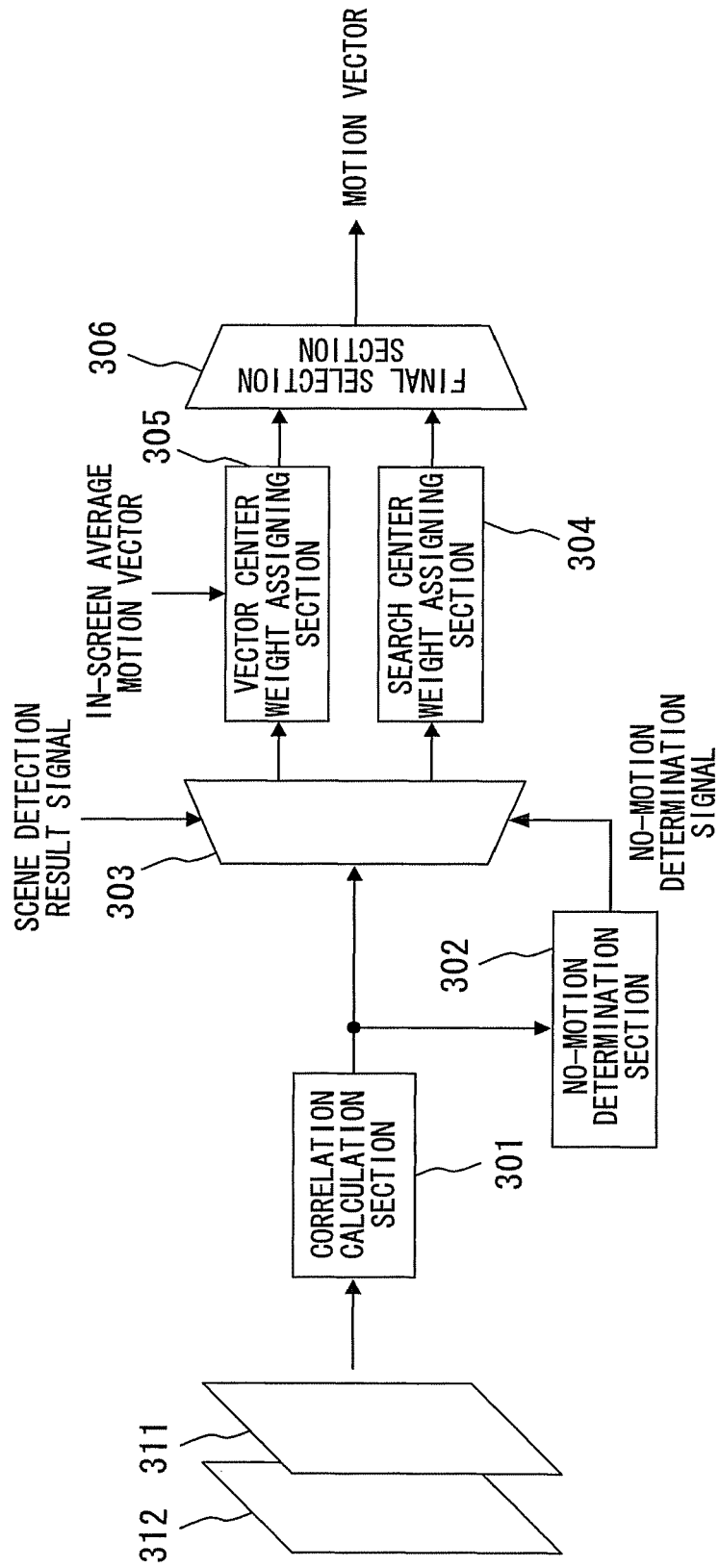
FIG. 3 illustrates a motion vector search section.

FIG. 3 illustrates an exemplary configuration of the motion vector search section 103. The motion vector search section 103 includes a correlation calculation section 301, a no-motion determination section 302, a weight assigning selection processing section 303, a search center weight assigning section 304, a vector center weight assigning section 305, and a final selection section 306. The correlation calculation section 301 and the no-motion determination section 302 each execute the process in a first operation, and the remaining components, i.e., the weight assigning selection processing section 303, the search center weight assigning section 304, the vector center weight assigning section 305, and the final selection section 306, each execute the process in a second operation.

The correlation calculation section 301 detects any correlation between video frames 311 and 312 on a block basis, and outputs a plurality of candidates for a motion vector also on a block basis. The video frame 311 is a frame indicated by a delay image signal, i.e., a frame one before the current frame, and the video frame 312 is the one indicated by the current image signal. These blocks are the results of dividing the video frame.

Based on the degree of video change observed in any of the blocks, and based on any of the motion vector candidates being in the no-motion state, the no-motion determination section 302 determines whether the block is located in the no-motion area, and then forwards a no-motion determination signal. The no-motion determination signal from the no-motion determination section 302 may be directed to the weight assigning selection processing section 303 together with the scene detection result signal from the scene selection section 101. As shown in FIG. 4A, in any frame against which the scene detection result signal indicates detection of a scene being scrolled, for any block against which the no-motion determination signal indicates that it is not located in the no-motion area, the weight assigning selection processing section 303 connects the output from the correlation calculation section 301 to the vector center weight assigning section 305. Also as shown in FIG. 4A, in any frame against which the scene detection result signal indicates detection of a scene being scrolled, for any block against which the no-motion determination signal indicates that it is located in the no-motion area, the weight assigning selection processing section 303 connects the output from the correlation calculation section 301 to the search center weight assigning section 304. Moreover, as shown in FIG. 4B, in any frame against which the scene detection result signal does not indicate detection of a scene being scrolled, the weight assigning selection processing section 303 connects the output from the correlation calculation section 301 to the search center weight assigning section 304 irrespective of whether the blocks are in the no-motion area or in the motion area.

The vector center weight assigning section 305 executes the following process to any block in a frame detected as including a scene being scrolled, and any block not located in the no-motion area. That is, the vector center weight assigning section 305 assigns weights to each correlation value, i.e., degree of similarity, of a plurality of motion vector candidates in such a block to make the motion vector candidate in the closer vicinity of the in-screen average motion vector more likely to be selected. After such weight assigning, the vector center weight assigning section 305 selects one of a plurality of motion vector candidates.

The search center weight assigning section 304 executes the following process to any block in a frame not detected as including a scene being scrolled, or to any block in a frame detected as including a scene being scrolled and any block located in the no-motion area. That is, the search center weight assigning section 304 assigns weights to each correlation value, i.e., degree of similarity, of the motion vector candidates in such a block to make the motion vector candidate showing less activity from the center of search for block more likely to be selected. After such weight assigning, the search center weight assigning section 304 selects one of a plurality of motion vector candidates. The final selection section 306 selects the motion vector provided from whichever of the two components operating, i.e., the vector center weight assigning section 305 and the search center weight assigning section 304, and outputs the selected motion vector.

Figure 5:
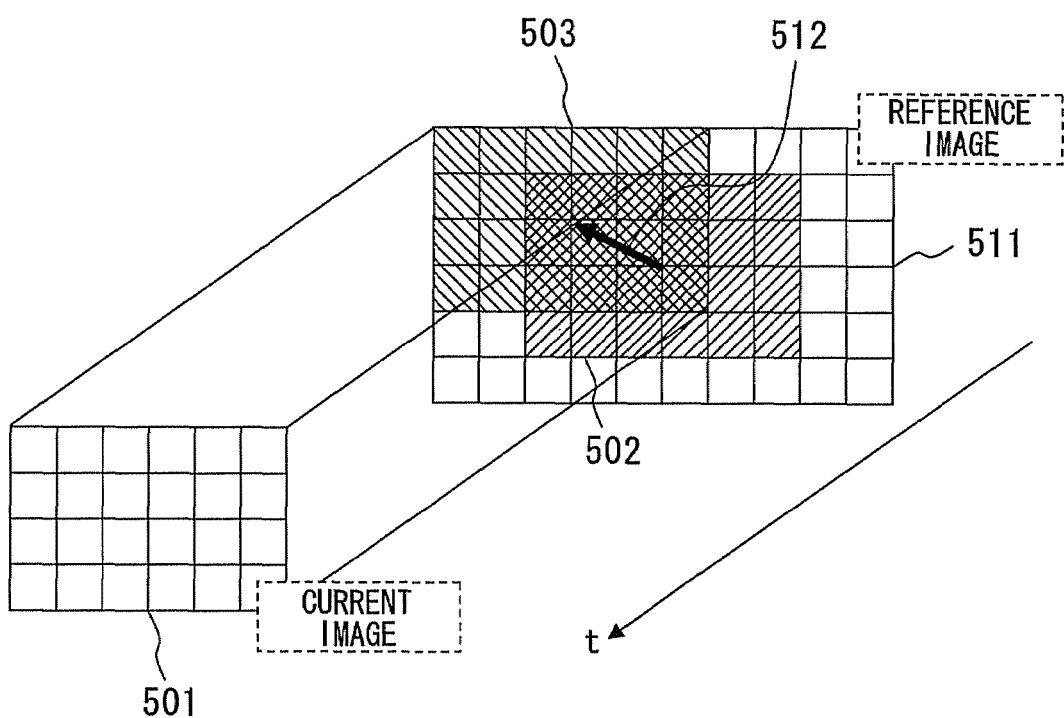
FIG. 5 illustrates an exemplary calculating of the degree of similarity between video frames.

As shown in FIG. 5, the correlation calculation section 301 calculates the degree of similarity between the current image of the video frame 312 and a reference image 511 of the video frame 311, and outputs the calculation result. For calculating the degree of similarity as such, first of all, a block 503 is found by a motion vector candidate 512 offsetting the position of a block 502 in the reference image 511. The block 502 is the one corresponding to a block 501 of n×m pixels in the current image. The blocks 501 and 503 are then subjected to a matching, thereby calculating the degree of similarity to the motion vector candidate 512. FIG. 5 illustrates how a pattern matching may be performed to the motion vector candidate (−2,−1).

The degree of similarity is generally the total sum of absolute differences of all pixels, i.e., n×m pixels, in a block. Accordingly, when the degree of similarity indicates a smaller value, a better matching is between the blocks 501 and 503.

Such a calculation is repeated to each of all the motion vector candidates in a search candidate (horizontal±Sx, vertical±Sy) so that a table of similarity including (2×Sx+1)× (2×Sy+1) is derived. Using the degree of video change in a block and the degree of similarity between any motion vector candidates being in the no-motion state, the no-motion determination section 302 determines on a block basis whether any activity is observed therein.

Figure 6B:
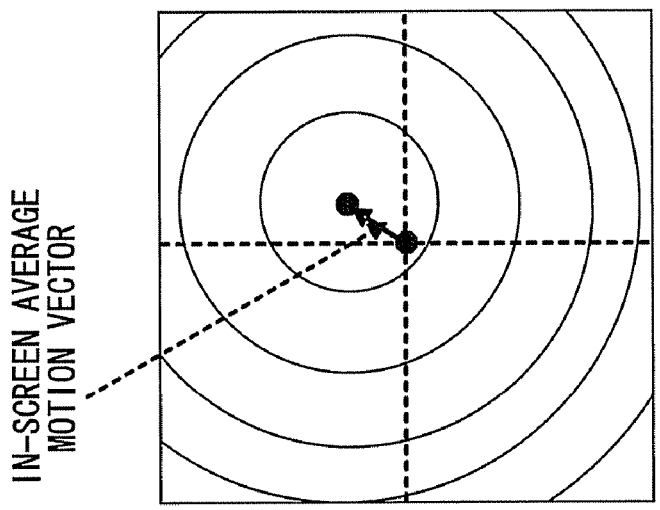
FIGS. 6A and 6B each illustrate the type of weight assigning.
Figure 6A:
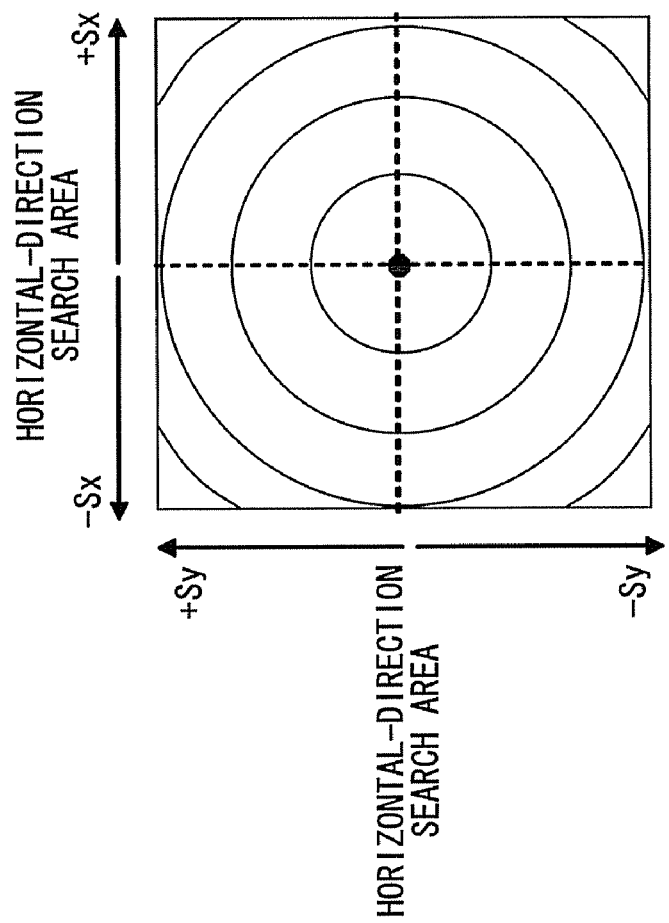

FIGS. 6A and 6B are each a diagram conceptually showing contour lines forming concentric circles. The contour lines are those indicating weights to be assigned by the search center weight assigning section 304 and the vector center weight assigning section 305 in accordance with the degree of similarity between the motion vector candidates in the search candidate (horizontal±Sx, vertical±Sy). When the degree of similarity indicates a smaller value, the motion vector candidate corresponding to the value is more likely to be selected. Accordingly, if with a smaller weight for assigning, the motion vector candidate assigned therewith is more likely to be selected, and on the other hand, if with a larger weight for assigning, the motion vector candidate assigned therewith is less likely to be selected. In FIGS. 6A and 6B, the weight at the center of the concentric circles is the smallest, and the weight is increased toward the outer edge of the concentric circles. The search center weight assigning section 304 assigns weights in such a manner that, as shown in FIG. 6A, a weight assigned to the degree of similarity is small in value with the motion vector candidate showing less activity from the center of search for block, thereby making the motion vector candidate more likely to be selected. On the other hand, the vector center weight assigning section 305 assigns weights in such a manner that, as shown in FIG. 6B, a weight assigned to the degree of similarity is the smallest in value with the motion vector candidates same as the in-screen average motion vector calculated by the scene selection section 101 (FIG. 1). Such weight assigning is then performed along the concentric circles formed around the position corresponding to the in-screen average motion vector. That is, with the weight assigning by the vector center weight assigning section 305, the center of weight assigning is offset in the direction of the in-screen average motion vector. As a result, weight assigning is so performed that, from a plurality of motion vector candidates in a block, any of those in the closer vicinity of the in-screen average motion vector is more likely to be selected.

As described above, based on the selection made by the weight assigning selection processing section 303, the vector center weight assigning section 305 operates with respect to any block not located in the no-motion area of the frame detected as including a scene being scrolled. Accordingly, the motion vectors determined for each of the blocks in the motion area of the frame including the scene being scrolled show an overall tendency to be aligned with the in-screen average motion vector in both direction and size, which are corresponding to the direction and speed of the scrolling.

On the other hand, in response to the selection made by the weight assigning selection processing section 303, the search center weight assigning section 304 operates with respect to any block in the frame not detected as including a scene being scrolled, or to any block located in the no-motion area of the frame detected as including a scene being scrolled. Accordingly, the motion vectors determined for each of the blocks are determined based on criteria with a premise that no large motion will occur, and are so controlled not to cause any rather erroneous extraction.

Figure 7A:
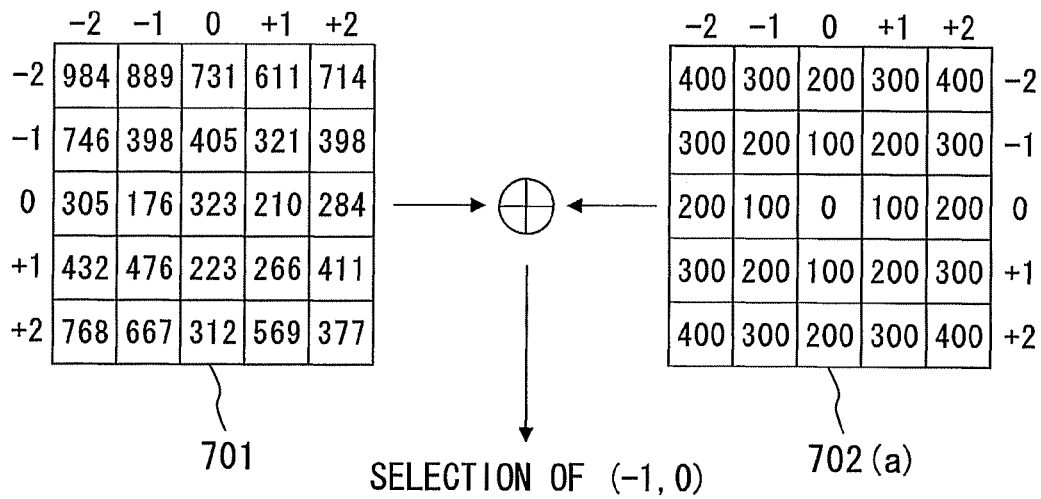
FIGS. 7A and 7B each illustrate a weight assigning value.
Figure 7B:
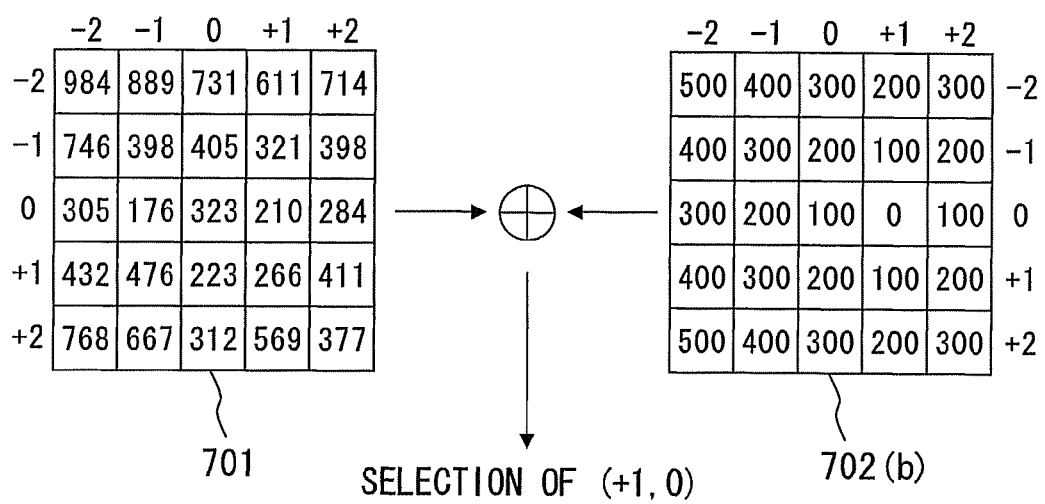

FIGS. 7A and 7B are each a diagram showing specific exemplary weights to be set based on the criteria of FIGS. 6A and 6B, respectively. In FIGS. 7A and 7B examples, the search area for a motion vector is assumed as being (±2,±2). In this case, the correlation calculation section 301 calculates the degree of similarity for 25 (=5×5) motion vector candidates around the motion vector candidate (0,0) in the no-motion state, and outputs a table of similarity 701. In the table of similarity 701, the horizontal direction denotes x components of the motion vector candidates, and the vertical direction denotes y components thereof. The value in each cell (x,y) denotes the degree of similarity found for each motion vector candidate (x,y).

The vector center weight assigning section 305 and the search center weight assigning section 304 respectively provide tables of weights 702a and 702b, which are each of the same size as the table of similarity 701. In these tables, a weight is set to each of the motion vector candidates.

In FIG. 7A, in accordance with the criteria of FIG. 6A, a weight at a point of origin (0,0) in the search area is set to "0", and the weight is increased concentrically as is away from the point of origin. On the other hand, in FIG. 7B, when the in-screen average motion vector found at the previous timing is (+1,0), for example, the weight for the coordinates (+1,0) corresponding thereto is "0", and the weight is increased concentrically as is away from the coordinates (+1,0).

The search center weight assigning section 304 adds together the degree of similarity found in the cells of the table of similarity 701 and the weights found in the cells of the table of weights 702a, and selects any of the motion vector candidates showing the resulting value being the smallest as a motion vector. In this example, selected as a motion vector is the candidate (−1,0) corresponding to the degree of similarity "176" being the smallest+the weight of "100".

On the other hand, the vector center weight assigning section 305 adds together the degree of similarity found in the cells of the table of similarity 701 and the weights in the cells of the table of weights 702b, and selects any of the motion vector candidates showing the resulting value being the smallest as a motion vector. In this case, when the calculation result of the table of similarity 701 is only used, selected as a motion vector is the candidate (−1,0) corresponding to the degree of similarity "176" being the smallest. However, if such a selection of motion vector may be performed after the calculation result is added with the values in the table of weights 702, the selection result will be the same as the in-screen average motion vector, i.e., (+1,0).

Figure 8:
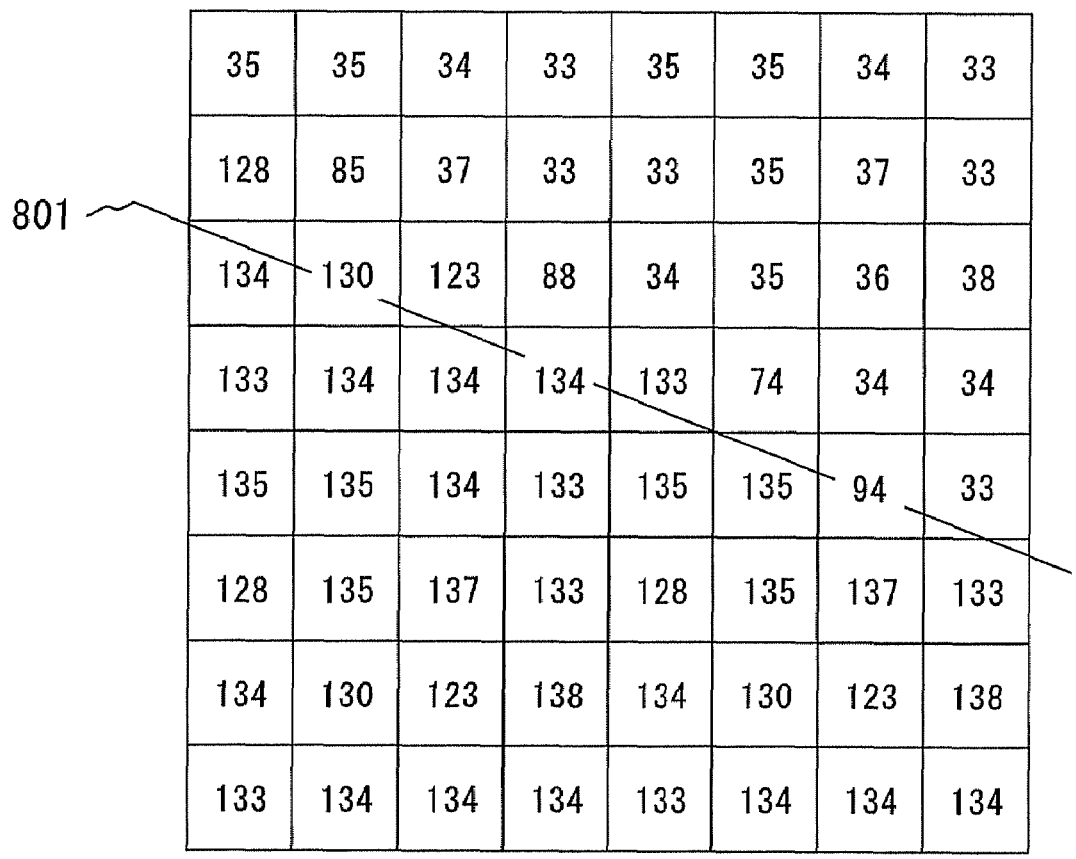
FIG. 8 illustrates an intensity value of each pixel in a block.

An example of a no-motion determination process by the no-motion determination section 302 is disclosed. FIG. 8 illustrates an intensity value of each of the pixels in a block configured by 8×8 pixels. In this example, the intensity values show a large change with a straight line 801 being the boundary, indicating a sharp edge on the straight line 801.

FIG. 9 illustrates a table of similarity when a search of motion vector for this block may be performed in the search area of (±2,±2). In this example, the degree of similarity "61" of the motion vector candidate (0,0) is found as being the smallest. In this case, either of the following two methods, i.e., first and second no-motion determination processes, is used for the no-motion determination.

With the first no-motion determination process, any distribution of pixel values in a block is used for calculating the degree of change. When intensity values are used as the pixel values, the degree of change may be calculated by the following equation 3, where $\Sigma$ denotes the total sum of all the pixels in the block.

$$\text{Degree of Change} = \sum \begin{pmatrix} \text{Absolute Difference Between Intensity Value of Target Pixel} \\ \text{and Intensity Value of Pixel on the Right Side Thereof +} \\ \text{Absolute Difference Between Intensity Value of Target} \\ \text{Pixel and Intensity Value of Pixel Therebelow} \end{pmatrix} \quad (3)$$

When the degree of change is large enough in value, when the degree of similarity of the motion vector candidate (0,0) is the smallest in value, and when the degree of similarity of the motion vector candidate (0,0) is sufficiently small in value, the corresponding block is determined as being in the no-motion state. As to the degree of change, when it is larger than a predetermined threshold value, the determination will be "large enough in value". As to the degree of similarity, when it is smaller than a predetermined threshold value, the determination will be "small enough in value".

Such threshold values can be determined by experiment. Assuming that an error a deviation of the pixel values is E, and assuming that the number of the pixels in a block is n×m, the threshold value for the degree of similarity, i.e., T1, is set to E×n×m, and the threshold value for the degree of change, i.e., T2, is set to be about twice of the threshold value T1.

With the second no-motion determination process, for calculating the degree of change, a difference between the maximum and minimum values of the degree of similarity in a search area is used. In this case, the degree of change may be calculated by the following equation 4.

Degree of Change=Maximum Value of Degree of Similarity−Minimum Value of Degree of Similarity (4)

When the degree of change is large enough in value, when the degree of similarity of the motion vector candidate (0,0) is the smallest in value, and when the degree of similarity of the motion vector candidate (0,0) is sufficiently small in value, the corresponding block is determined as being in the no-motion state. In this case, the threshold value T1 for the degree of similarity is set to the value described above, and the threshold value 12 for the degree of change is set to a value about three times larger than the threshold value T1, for example.

In FIGS. 8 and 9 examples, due to the sharp edge on the straight line 801, the degree of change being the result of the equation 3 is large enough in value, and the degree of change of the equation 4 is 984−61=923, i.e., the value is also sufficiently large. Moreover, the degree of similarity "61" of the motion vector candidate (0,0) is the smallest in value in the search area, and the value is also sufficiently small. As such, in both of the first and second no-motion determination processes, the corresponding block is determined as being in the no-motion state.

Figure 10:
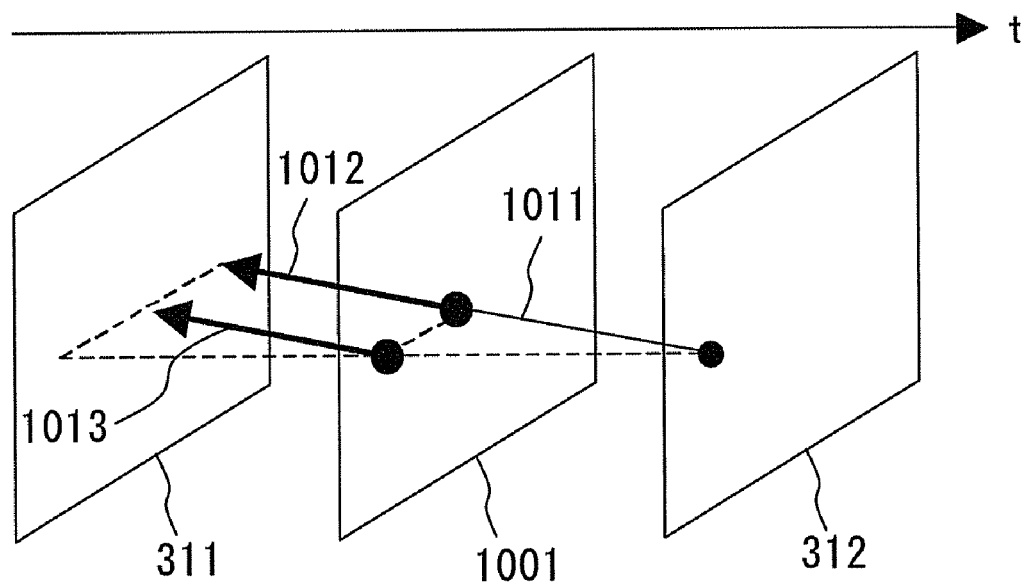
FIG. 10 illustrates an interpolation vector.

FIG. 10 illustrates an interpolation vector to be generated by the interpolation image generation section 105. When an interpolation frame 1001 is generated between the video frames 311 and 312, first of all, the interpolation image generation section 105 generates a vector 1012 with the size of ½ of a motion vector 1011, and the starting point of the resulting vector 1012 is displaced, thereby generating an interpolation vector 1013.

Figure 11:
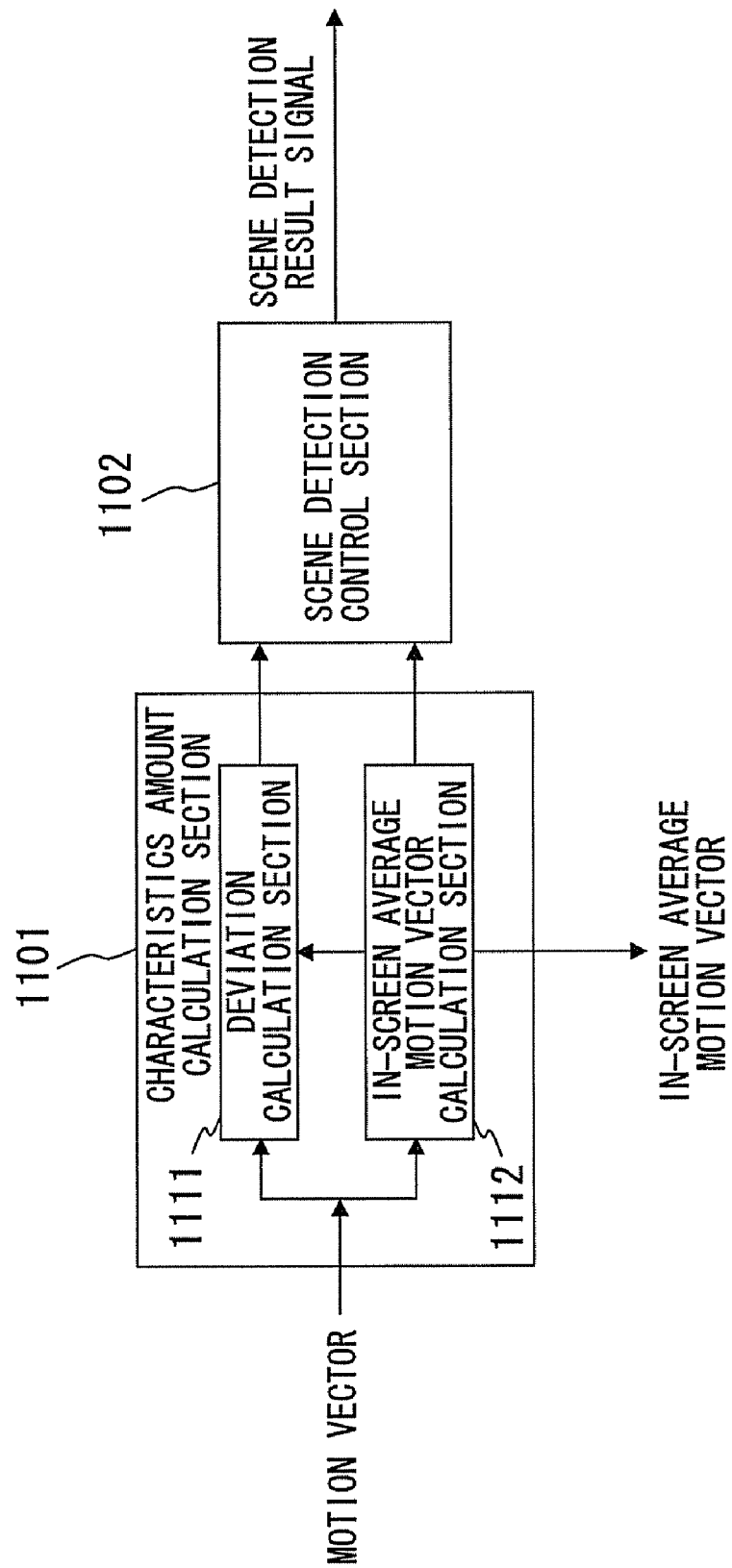
FIG. 11 illustrates a scene selection section.

FIG. 11 illustrates an exemplary configuration of the scene selection section 101. The scene selection section 101 is configured to include a characteristics amount calculation section 1101, and a scene detection control section 1102. The characteristics amount calculation section 1101 is configured to include a deviation calculation section 1111, and an in-screen average motion vector calculation section 1112.

By the method of FIG. 2, the in-screen average motion vector calculation section 1112 calculates an in-screen average motion vector mvaveall from the motion vector of a frame. The result is stored in the storage section 102, and is also forwarded to both the deviation calculation section 1111 and the scene detection control section 1102.

Using the in-screen average motion vector mvaveall, the deviation calculation section 1111 calculates a deviation $\Delta$ of the motion vector by the following equation 5.

$$\Delta = \sum_{j=0}^{N_y-1} |mvave(j) - mvaveall| \quad (5)$$

With the equation 5, the deviation $\Delta$ may be calculated from a difference between the in-screen average motion vector mvaveall and an average value mvave(j), which is an average value of the motion vector mv(i,j) in the horizontal direction. As an alternative to the average value mvave(j), an average value mvave(i) of the motion vector mv(i,j) in the vertical direction may be used. Still alternatively, the deviation $\Delta$ may be the sum of the deviation found from the average value mvave(j) and the deviation found from the average value mvave(i).

The scene detection control section 1102 uses a determination value being a result of dividing the deviation $\Delta$ by the value of the in-screen average motion vector mvaveall. When the determination value is small enough, the scene detection control section 1102 determines that the motion in the screen is uniform, i.e., any scene with the interpolation effects is detected, and turns ON the scene detection result signal. When the determination value is smaller than a predetermined threshold value, the scene detection control section 1102 turns ON the scene detection result signal, and when the determination value is equal to or larger than the threshold value, turns OFF the scene detection result signal. Herein, the scene detection control section 1102 may use the deviation $\Delta$ itself as a determination value.

As described above, for any frame detected as including a scene being scrolled, and for any block not in the no-motion area, the frame interpolation device of this embodiment keeps the previous in-screen average motion vector, and during the search of motion vector at the current time, controls the weight assigning to be performed based on the previous in-screen average motion vector. Accordingly, to the blocks located in the motion area in the frame including a scene being scrolled, the interpolation process to be executed illustrates an overall tendency to well follow the direction and speed of the scrolling. On the other hand, for any block in the frame not detected as including a scene being scrolled, or for any block located in the no-motion area of the frame detected as including a scene being scrolled, the motion vector is determined based on criteria with a premise that no large motion will occur, and are so controlled not to cause any rather erroneous extraction.

As such the motion vector may be prevented from deviating by performing frame interpolation only to the motion area including scenes being scrolled, for example. Also in an exemplary embodiment, to any video not including a scene being scrolled, or to the no-motion area in the video, even if the video is with a low frame rate, the video is subjected to frame interpolation not to cause that much irregularities of the video. This accordingly protects the resulting reproduced image not to look awkward. Moreover, in this case, in the embodiment, various types of movements in the video can be prevented from looking more awkward by being directed toward only one direction of the in-screen average motion vector.

Figure 12:
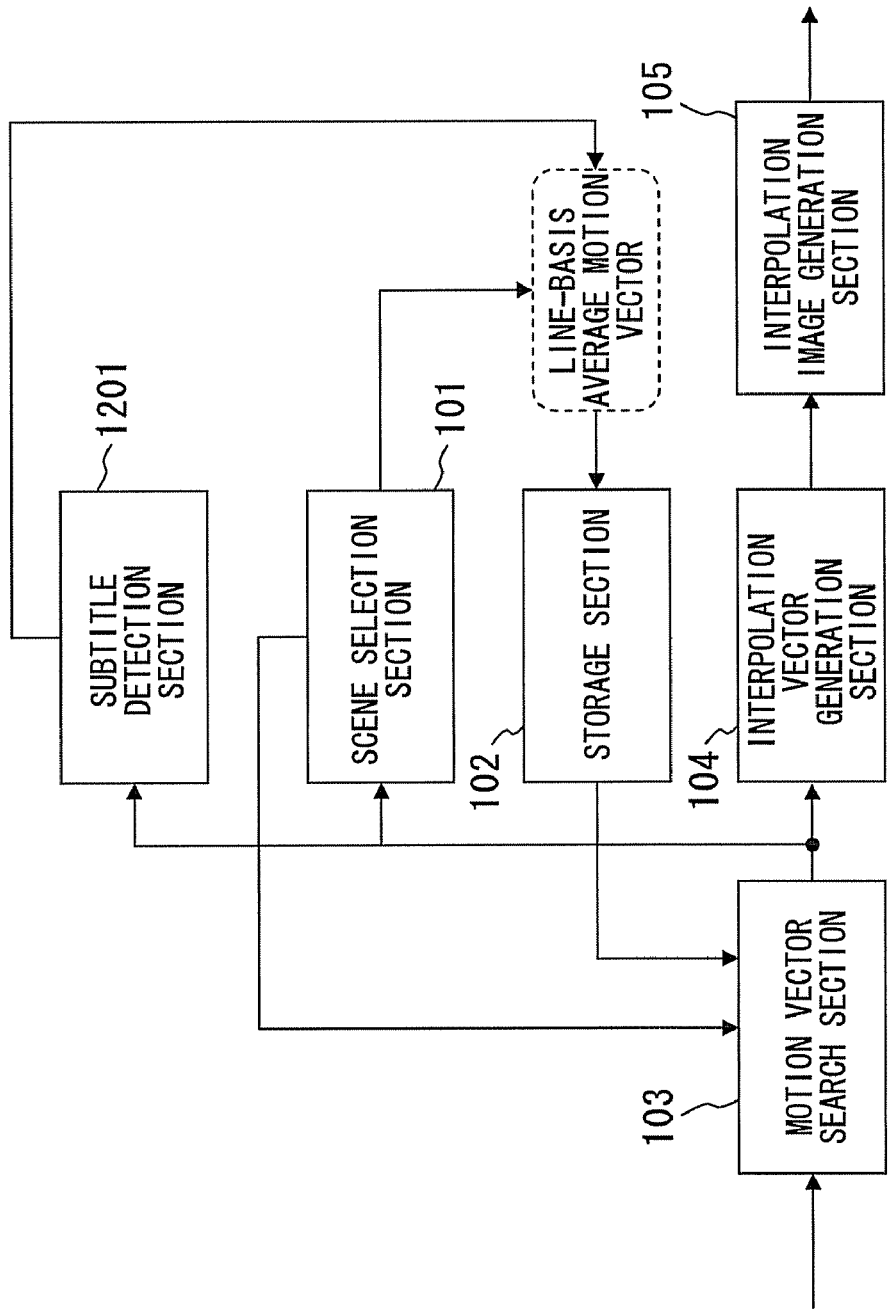
FIG. 12 illustrates a frame interpolation device of another embodiment.

FIG. 12 illustrates an exemplary configuration of the frame interpolation device of another embodiment. In this embodiment, the configuration is different from that of FIG. 1, i.e., a subtitle detection section 1201 is provided, and from the storage section 102 to the motion vector search section 103, an average motion vector is provided on a line basis as an alternative to the in-screen average motion vector. The subtitle detection section 1201 detects a subtitle being scrolled from the motion vector provided by the motion vector search section 103. After detecting the subtitle being scrolled, the subtitle detection section 1201 sets a motion vector as a line-basis average motion vector corresponding to the line of the subtitle being scrolled. The motion vector here is the one determined by the direction and speed of the scrolling. For the remaining lines, the subtitle detection section 1201 sets the motion vector indicating the no-motion state as the line-basis average motion vector. Moreover, when any scene is detected by the scene selection section 101, as the line-basis average motion vector, an in-screen average motion vector is uniformly set. The line-basis average motion vector set as such is provided to the vector center weight assigning section 305 (refer to FIG. 3) in the motion vector search section 103 via the storage section 102 so that the resulting weight assigning can be performed with a higher accuracy.

Figure 13:
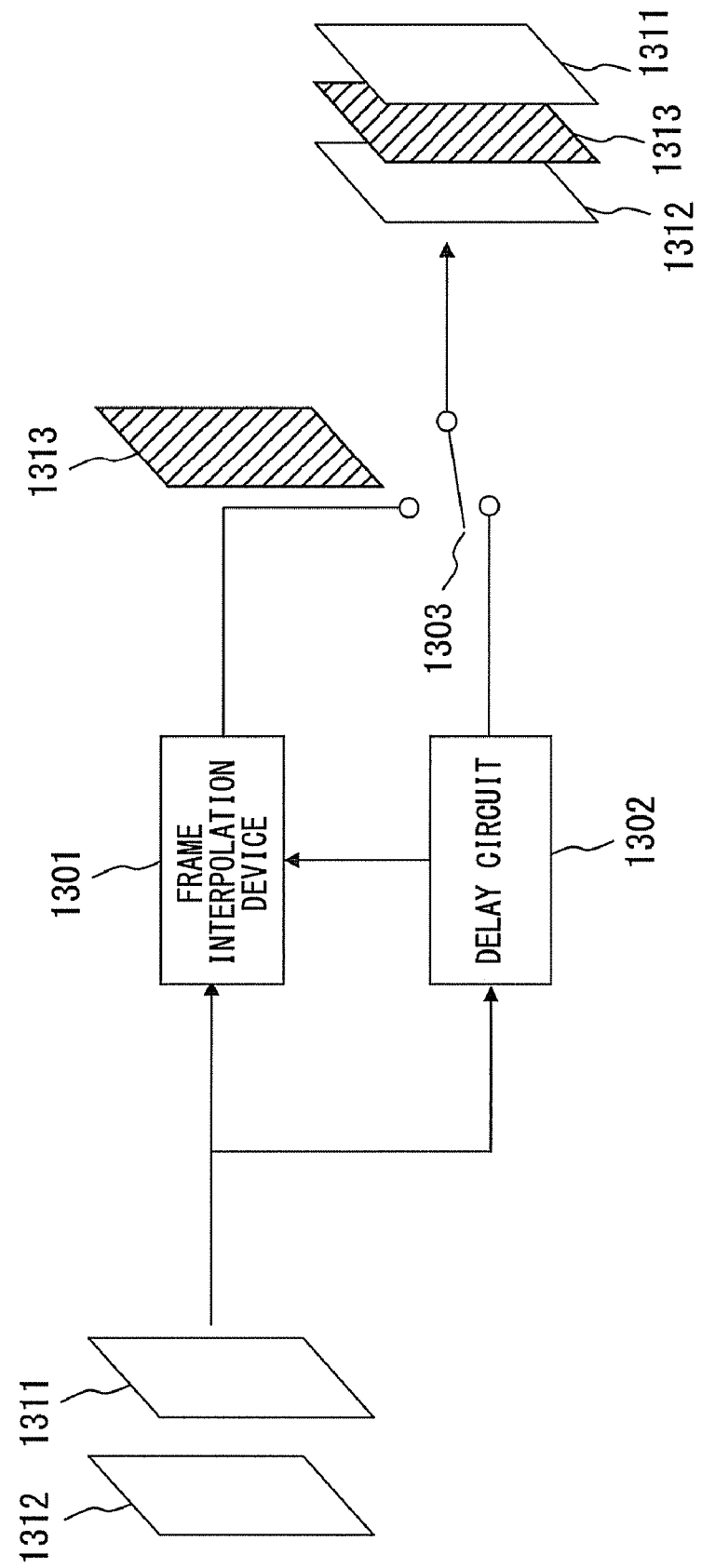
FIG. 13 illustrates a frame rate conversion device.

FIG. 13 illustrates an exemplary configuration of a frame rate conversion device utilizing the frame interpolation device of the embodiment. This frame rate conversion device is configured to include a frame interpolation device 1301, a delay circuit 1302, and a switch 1303, and increases the frame rate of an input image.

The delay circuit 1302 delays video frames 1311 and 1312 provided in a sequential manner by a predetermined length of time before output. The frame interpolation device 1301 generates an interpolation frame 1313 from the video frame 1312 at the current time, and the video frame 1311 at the time before provision from the delay circuit 1302. The switch 1303 alternately selects the video frame coming from the delay circuit 1302 and the interpolation frame 1313 coming from the frame interpolation device 1301 for output. As such, from the frame rate conversion device, provided are the frames in order, i.e., the video frame 1311, the interpolation frame 1313, and the video frame 1312.

Figure 14:
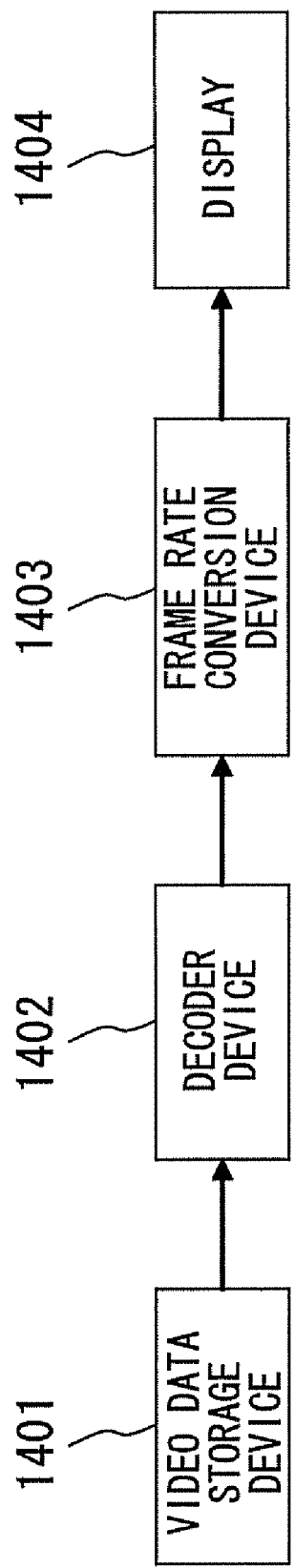
FIG. 14 illustrates a video reproduction device.

FIG. 14 illustrates an exemplary configuration of a video reproduction device using the frame rate conversion device of FIG. 13. This video reproduction device is configured to include a video data storage device 1401, a decoder device 1402, a frame rate conversion device 1403, and a display 1404. The decoder device 1402 decodes video data stored in the video data storage device 1401, and outputs a video frame. The frame rate conversion device 1403 inserts an interpolation frame between the video frames, and the display 1404 then displays these frames on the screen in a time series.

Figure 15:
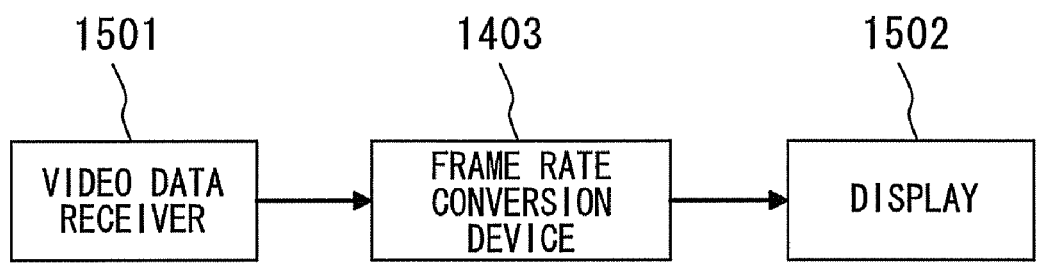
FIG. 15 illustrates a video display device.

FIG. 15 illustrates an exemplary configuration of a video display device utilizing the frame rate conversion device of FIG. 13. This video display device is configured to include a video data receiver 1501, the frame rate conversion device 1403, and a display 1502. The video data receiver 1501 is provided with video frames over a communications network. The frame rate conversion device 1403 inserts an interpolation frame between any video frames received by the video data receiver 1501, and the display 1502 displays these frames on the screen in a time series.

Figure 16:
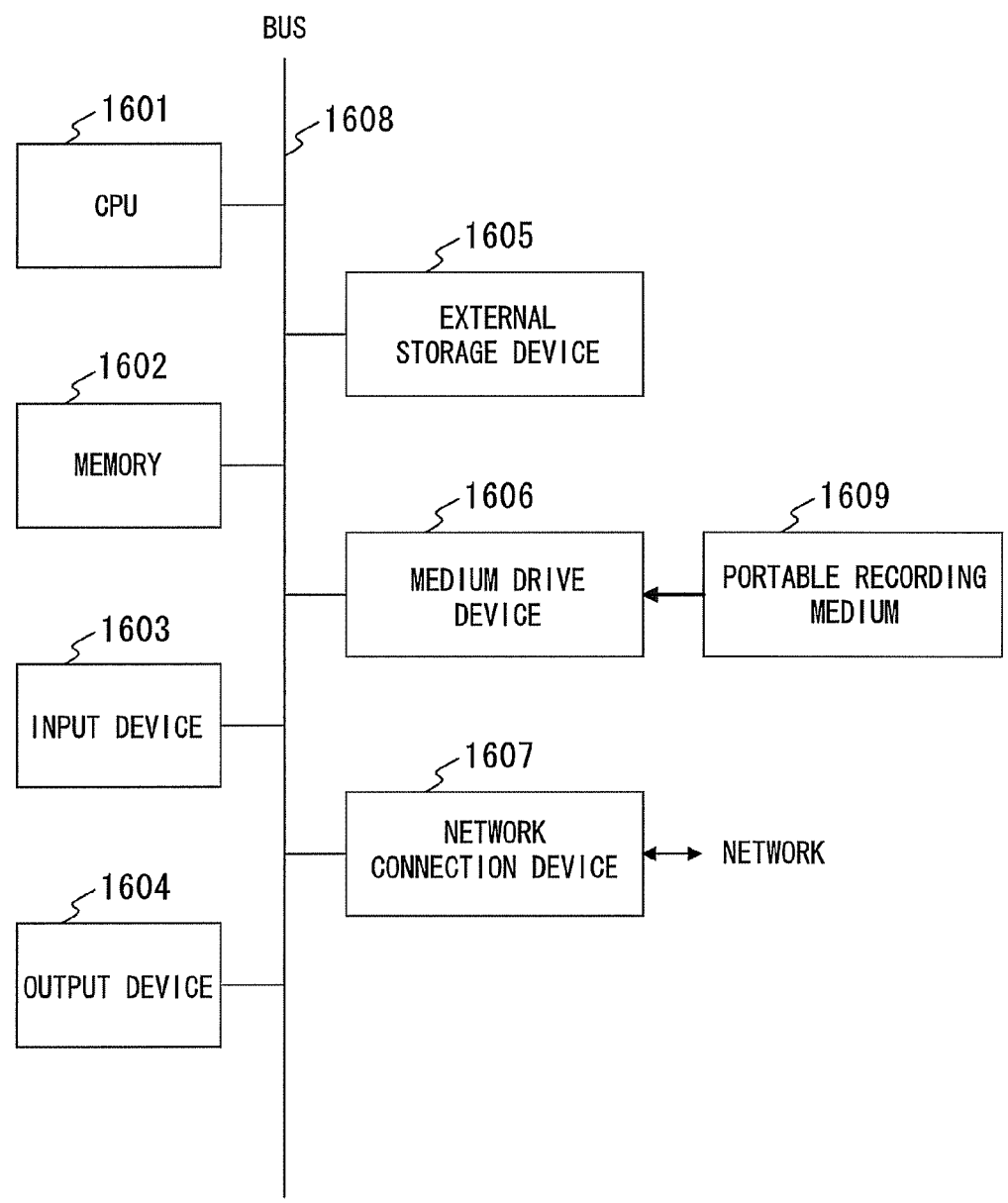
FIG. 16 illustrates an information processing device.

When the processes to be executed by the frame interpolation device 1301 and the frame rate conversion device 1403 are implemented by software, an information processing device, i.e., computer, as shown in FIG. 16 is used. The information processing device of FIG. 16 is configured to include a CPU (Central Processing Unit) 1601, a memory 1602, an input device 1603, an output device 1604, an external storage device 1605, a medium drive device 1606, and a network connection device 1607. These components are connected to one another for communications by a bus 1608.

The memory 1602 may include a ROM (Read Only Memory), a RAM (Random Access Memory), and others, and stores programs and data for use with processing. The CPU 1601 runs the programs using the memory 1602, thereby executing the frame interpolation process and the frame rate conversion process.

In this case, an incoming video frame is stored in the memory 1602 as data being a processing target, and any found motion vector is stored in the memory 1602 as data being the processing result. The memory 1602 is an example of the storage section 102. The programs stored in the memory 1602 are exemplary functions of implementing the components, i.e., the scene selection section 101, the motion vector search section 103, the interpolation vector generation section 104, and the interpolation image generation section 105.

The input device 1603 may include a keyboard, a pointing device, and others, and is used for input of commands and information by an operator. The output device 1604 includes a display, a printer, a speaker, and others, and is used for making an inquiry to the operator and for output of the processing result.

The external storage device 1605 may include a magnetic disk device, an optical disk device, a magneto-optical disk device, a tape device, and others. The information processing device stores in advance programs and data in this external storage device 1605, and as needed, loads these into the memory 1602 for use.

The medium drive device 1606 drives a portable recording medium 1609, and accesses the storage contents thereof. The portable recording medium 1609 may be arbitrary computer-readable recording medium such as memory card, flexible disk, optical disk, and magneto-optical disk. The operator stores in advance programs and data in this portable recording medium 1609, and as needed, loads these to the memory 1602 for use.

The network connection device 1607 is connected to a communications network such as LAN (Local Area Network), and performs data conversion associated with the communications. Moreover, the information processing device is provided with programs and data from any external device via the network connection device 1607 as needed, and loads these to the memory 1602 for use.

Figure 17:
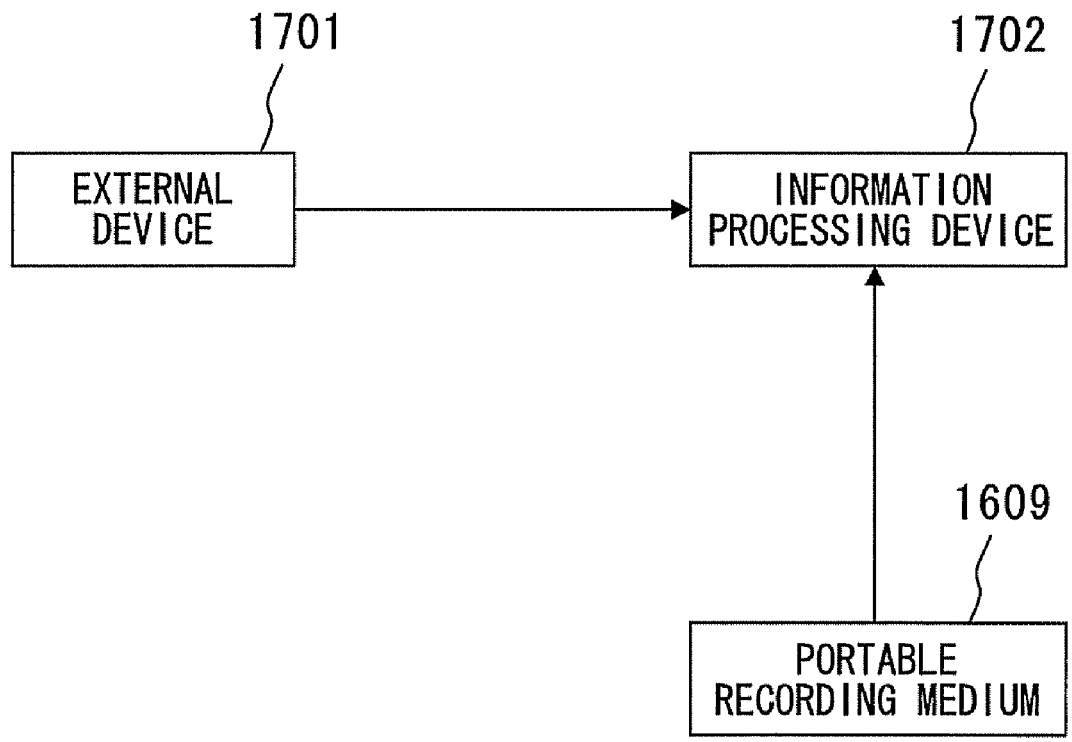
FIG. 17 illustrates a method of providing programs and data.
Figure 18:
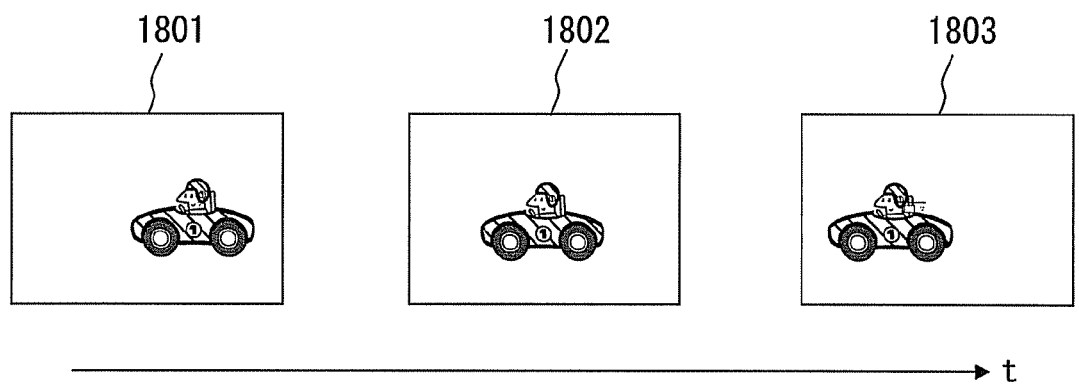
FIG. 18 depicts motion interpolation.
Figure 19:
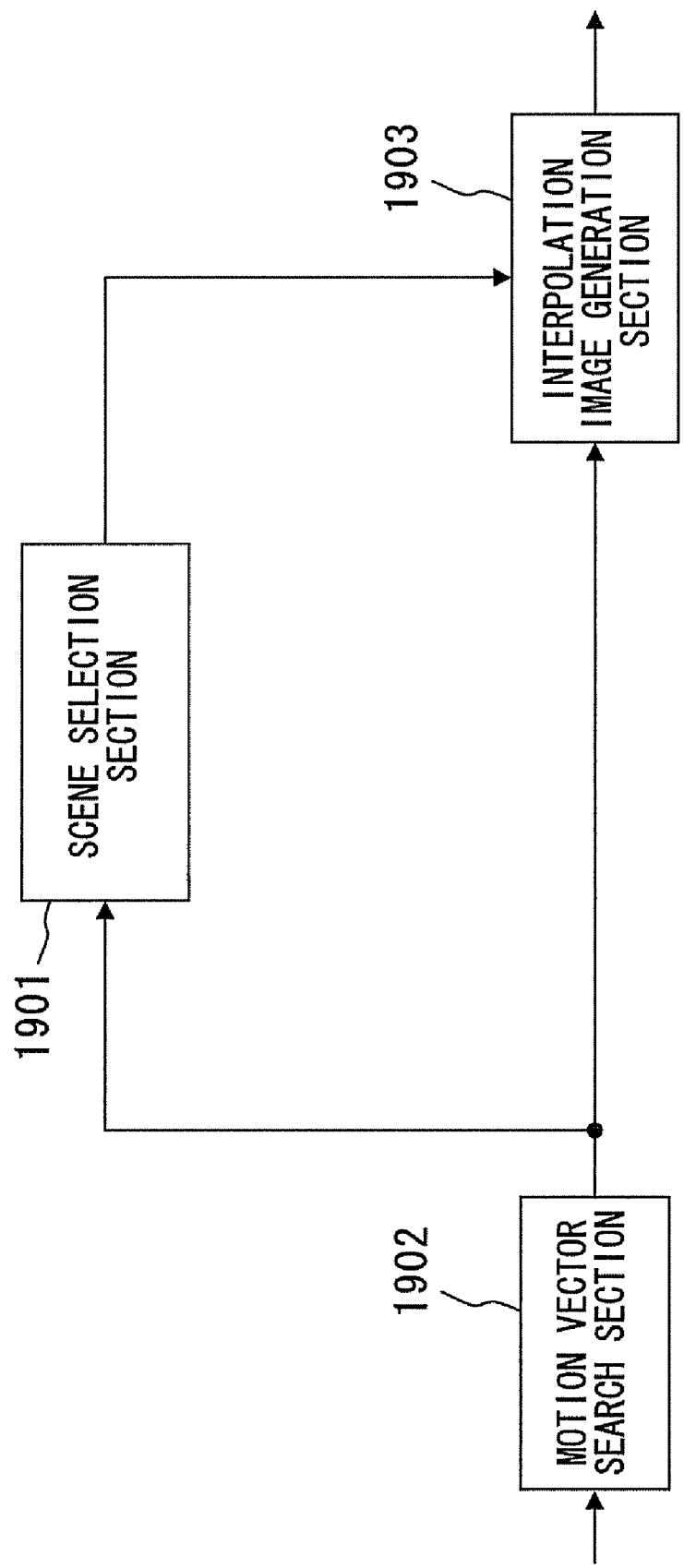
FIG. 19 illustrates a frame interpolation device selectively on the basis of scene.

FIG. 17 illustrates a method of providing programs and data to the information processing device of FIG. 16. The programs and data stored in the database of the portable recording medium 1609 and that of an external device 1701 are loaded to the memory 1602 of an information processing device 1702. The external device 1701 generates a carrier signal for carrying the programs and data, and forwards these to the information processing device 1702 via any arbitrary transmission medium on the communications network. The CPU 1601 runs the program using the data, and executes the processes described above. The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A frame interpolation device that calculates a motion vector for every block in every input video frame, and generates an interpolation frame from the resulting motion vectors, the device comprising:

an in-screen average motion vector calculation section that calculates an in-screen average motion vector in a screen for each of the video frames, the in-screen average motion vector being averaged the motion vectors in the screen;

a scene detection control section that detects any scene showing a uniform motion in each of the video frames;

a correlation calculation section that calculates, for each of a plurality of motion vector candidates for each of the blocks in the video frame currently being a target, a correlation value between the current-target video frame and other previous video frames;

a no-motion determination section that determines whether the blocks in the current-target video frame are in a no-motion area;

a search center weight assigning section that performs weight assigning to the correlation value of each of the plurality of motion vector candidates in each of the blocks to make the motion vector candidate showing less activity from a center of search for block more likely to be selected, and determines a first motion vector candidate among the plurality of motion vector candidates;

a vector center weight assigning section that performs weight assigning to the correlation value of each of the plurality of motion vector candidates in each of the blocks to make the motion vector candidate in the closer vicinity of the in-screen average motion vector more likely to be selected, and determines a second motion vector candidate among the plurality of motion vector candidates;

a weight assigning selection processing section that selects the search center weight assigning section or the vector center weight assigning section based on a scene detection result by the scene detection control section and a determination result by the no-motion determination section, for each of the blocks in the current-target video frame, and provides thereto the correlation value output from the correlation calculation section; and a final selection section that outputs the first motion vector candidate or the second motion vector candidate provided the correlation value from the search center weight assigning section or the vector center weight assigning section selected by weight assigning selection processing section.

2. The frame interpolation device according to claim 1, wherein the weight assigning selection processing section selects, when the scene detection control section detects the scene, and when the no-motion determination section does not determine the no-motion area, the vector center weight assigning section, and selects, when the detection control section does not detect the scene, or when the no-motion determination section determines the no-motion area, the search center weight assigning section.

3. A frame interpolation method of calculating a motion vector for every block in every input video frame, and generating an interpolation frame from the resulting motion vectors, the method comprising:

calculating an in-screen average motion vector in a screen for each of the video frames, the in-screen average motion vector being averaged the motion vectors in the screen;

detecting any scene showing a uniform motion in each of the video frames;

calculating, for each of a plurality of motion vector candidates for each of the blocks in the video frame currently being a target, a correlation value between the current-target video frame and other previous video frames;

determining whether each of the blocks in the current-target video frame is in a no-motion area;

selecting a first calculation process or a second calculation process based on a result of the scene detection and a result of the determination about the no-motion area, for each of the blocks in the current-target video frame, wherein in the first calculation process, after performing weight assigning to the correlation value of each of the plurality of motion vector candidates in each of the blocks to make the motion vector candidate showing less activity from a center of search for block more likely to be selected, determining the first motion vector candidate among the plurality of motion vector candidates, in the second calculation process, after performing weight assigning to the correlation value of each of the plurality of motion vector candidates in each of the blocks to make the motion vector candidate in the closer vicinity of the in-screen average motion vector more likely to be selected, determining the second motion vector candidate among the plurality of motion vector candidates, providing either the first calculation process or the second calculation process selected in the selecting with the correlation value calculated in the calculating; and outputting the first motion vector candidate or the second motion vector candidate determined by the first calculation process or the second calculation process selected in the selecting.

4. The frame interpolation method according to claim 3, wherein when the scene is detected through the detection of scene, and when a result of the determination tells that the blocks are not in the no-motion area, the second calculation process is performed; and when the scene is not detected through the detection of scene, or when the result of the determination tells that the blocks are in the no-motion area, the first calculation process is performed.

5. A non-statutory computer readable storage medium storing a program, the program executing a frame interpolation process for calculating a motion vector for every block in every input video frame and generating an interpolation frame from the resulting motion vectors, the program allowing the computer to execute a method, the method comprising:

calculating an in-screen average motion vector in a screen for each of the video frames, the in-screen average motion vector being averaged the motion vectors in the screen;

detecting any scene showing a uniform motion in each of the video frames;

calculating, for each of a plurality of motion vector candidates for each of the blocks in the video frame currently being a target, a correlation value between the current-target video frame and other previous video frames;

determining whether each of the blocks in the current-target video frame is in a no-motion area;

selecting a first calculation process or a second calculation process based on a result of the scene detection and a result of the determination about the no-motion area, for each of the blocks in the current-target video frame, wherein in the first calculation process, after performing weight assigning to the correlation value of each of the plurality of motion vector candidates in each of the blocks to make the motion vector candidate showing less activity from a center of search for block more likely to be selected, determining the first motion vector candidate among the plurality of motion vector candidates, in the second calculation process, after performing weight assigning to the correlation value of each of the plurality of motion vector candidates in each of the blocks to make the motion vector candidate in the closer vicinity of the in-screen average motion vector more likely to be selected, determining the second motion vector candidate among the plurality of motion vector candidates, providing either the first calculation process or the second calculation process selected in the selecting with the correlation value calculated in the calculating; and outputting the first motion vector candidate or the second motion vector candidate determined by the first calculation process or the second calculation process selected in the selecting.

6. The non-statutory computer readable storage medium storing a program according to claim 5, wherein when the scene is detected through the detection of scene, and when a result of the determination tells that the blocks are not in the no-motion area, the second calculation process is performed; and when the scene is not detected through the detection of scene, or when the result of the determination tells that the blocks are in the no-motion area, the first calculation process is performed.

* * * * *

UNITED STATES PATENT AND TRADEMARK OFFICE
CERTIFICATE OF CORRECTION

| | |
|---|---|
| PATENT NO. | : 8,320,458 B2 |
| APPLICATION NO. | : 12/619319 |
| DATED | : November 27, 2012 |
| INVENTOR(S) | : Teruyuki Sato |

It is certified that error appears in the above-identified patent and that said Letters Patent is hereby corrected as shown below:

Title Page Item [57] (Abstract); Line 9, Delete "each the" and insert -- each --, therefor.

Signed and Sealed this
Twelfth Day of March, 2013

Teresa Stanek Rea
*Acting Director of the United States Patent and Trademark Office*